(12) United States Patent
Uchida

(10) Patent No.: US 11,027,556 B2
(45) Date of Patent: Jun. 8, 2021

(54) INK COMPOSITION AND INK JET RECORDING SET

(71) Applicant: Seiko Epson Corporation, Tokyo (JP)

(72) Inventor: Kenta Uchida, Matsumoto (JP)

(73) Assignee: Seiko Epson Corporation

(*) Notice: Subject to any disclaimer, the term of this patent is extended or adjusted under 35 U.S.C. 154(b) by 0 days.

(21) Appl. No.: 16/724,477

(22) Filed: Dec. 23, 2019

(65) Prior Publication Data

US 2020/0198358 A1    Jun. 25, 2020

(30) Foreign Application Priority Data

Dec. 25, 2018  (JP) .............................. JP2018-240844

(51) Int. Cl.
    *B41J 2/175*     (2006.01)
    *C09D 11/322*    (2014.01)
    *B41M 5/00*      (2006.01)
    *C09D 11/107*    (2014.01)

(52) U.S. Cl.
    CPC ........ *B41J 2/17553* (2013.01); *B41M 5/0023* (2013.01); *C09D 11/107* (2013.01); *C09D 11/322* (2013.01); *C08J 2367/07* (2013.01); *C08J 2467/07* (2013.01)

(58) Field of Classification Search
    CPC .... B41J 2/175; B41J 2/17506; B41J 2/17523; B41J 2/17553; B41J 29/13; B41M 5/0023; C09D 11/00; C09D 11/106; C09D 11/107; C09D 11/322; C08J 2367/07; C08J 2467/07
    See application file for complete search history.

(56) References Cited

U.S. PATENT DOCUMENTS

| | | | |
|---|---|---|---|
| 2012/0236078 A1* | 9/2012 | Nakazawa | B41J 2/2107 347/56 |
| 2014/0168326 A1* | 6/2014 | Nariai | B41J 2/2107 347/86 |
| 2016/0271962 A1 | 9/2016 | Omuro et al. | |
| 2018/0187031 A1 | 7/2018 | Teramoto et al. | |

FOREIGN PATENT DOCUMENTS

| | | |
|---|---|---|
| JP | 2016-172358 A | 9/2016 |
| JP | 2018-109119 A | 7/2018 |

\* cited by examiner

*Primary Examiner* — Anh T Vo
(74) *Attorney, Agent, or Firm* — Harness, Dickey & Pierce, P.L.C.

(57) ABSTRACT

An ink composition to be used in an ink jet recording apparatus includes a self-dispersing pigment, a soap-free resin, and water. When 15 g of the ink composition is weighed into a 50-mL sample bottle and the sample bottle is shaken 100 times for one minute, at 60 seconds after shaking, a foam height from a liquid level is 1 cm or less.

5 Claims, 7 Drawing Sheets

INK COMPOSITION AND INK JET RECORDING SET

The present application is based on, and claims priority from, JP Application Serial Number 2018-240844, filed Dec. 25, 2018, the disclosure of which is hereby incorporated by reference herein in its entirety.

BACKGROUND

1. Technical Field

The present disclosure relates to an ink composition and an ink jet recording set.

2. Related Art

Hitherto, as disclosed in JP-A-2016-172358, there has been known an ink jet printer, as an example of a liquid ejecting apparatus, which records an image and the like on a recording medium with fine ink droplets ejected from nozzles of a liquid ejecting head. An ink jet printer disclosed in JP-A-2016-172358 includes an ink tank for supplying an ink to a liquid ejecting head. The ink tank has a liquid pouring port provided on the upper side thereof and a liquid containing portion which communicates with the liquid pouring port and the outside air. The user inserts a supply port of an ink bottle into the liquid pouring port and pours an ink contained in the ink bottle into the ink tank. That is, the ink tank is a so-called continuous supply type ink storage container in which, when the ink contained in the ink tank is exhausted, an ink is replenished from outside instead of replacing the ink tank.

An ink jet printer provided with such a continuous supply type ink storage container into which an ink can be refilled may be used in some cases to print letters and images on plain paper in an office, SOHO, or the like. Therefore, image robustness, such as water resistance and line marker resistance, of a printed material is required.

In order to guarantee the image robustness of a printed material, for example, JP-A-2018-109119 discloses an ink composition including a pigment, an organic compound, and water. Specifically, the ink composition disclosed has a resolubility index of 0.5 minutes or more and 10 minutes or less, the resolubility index indicating a time required in which after the mass of the ink composition is decreased by 50%, the viscosity thereof is returned to an ink viscosity before the mass is decreased by addition of water in an amount equivalent to the decreased mass. It is stated that such an ink composition can suppress generation of gas-liquid interface foreign materials in long-term printing using a continuous supply type ink storage container, achieving excellent continuous printing stability and it is possible to obtain a printed material having excellent image robustness.

On the other hand, in such a continuous supply type ink storage container, from the standpoint of convenience for the user in terms of refilling frequency and reduction of waste of ink bottles which are ink supply containers that supply ink to the ink storage container, a further increase in the capacity of the ink storage container is anticipated. In order to increase the capacity of the ink storage container, it is taken into consideration to increase the capacity of the ink storage container in the height direction so as to avoid an increase in the installation area of the ink jet recording apparatus.

Such an increase in the capacity of the ink storage container in the height direction poses a problem in that an ink is likely to foam when the ink is poured into the ink storage container. The reason for this is that the distance of falling of the ink from the supply port of the ink supply container to an inner wall inside the ink storage container or a liquid surface of the ink increases.

Furthermore, another factor that may aggravate foaming is an anionic surfactant contained in a resin which is added to improve abrasion resistance of a printed material and to stabilize dispersion of a pigment. Accordingly, when the ink composition including a resin coated pigment or the ink composition including a resin having a self-dispersing pigment and an anionic surfactant added thereto, which is described in JP-A-2018-109119, is poured into an ink storage container whose capacity is increased in the height direction, there is a concern that printing trouble may occur because foam generated during pouring reaches a liquid ejecting head or the waiting time for waiting until foam naturally disappears may be prolonged.

SUMMARY

An ink composition according to the present disclosure is an ink composition to be used in an ink jet recording apparatus, the ink composition including a self-dispersing pigment, a soap-free resin, and water, in which, when 15 g of the ink composition is weighed into a 50-mL sample bottle and the sample bottle is shaken 100 times for one minute, at 60 seconds after shaking, a foam height from a liquid level is 1 cm or less.

In the ink composition, the ink jet recording apparatus may include an ink storage container having an ink pouring port, and a height from an inner wall of the ink storage container facing the ink pouring port to the ink pouring port may be 3 cm or more.

In the ink composition, a content A of the self-dispersing pigment may be 4.0% by mass or more and 8.0% by mass or less, a content B of the soap-free resin may be 1.5% by mass or more and 5.0% by mass or less, a total value F of the content A of the self-dispersing pigment and the content B of the soap-free resin may be 5.5% by mass or more and 11.0% by mass or less, and the ratio in percent by mass of the content A of the self-dispersing pigment to the content B of the soap-free resin, k=A/B, may be 3.0 or less.

An ink jet recording set according to the present disclosure includes an ink jet recording apparatus and an ink supply container containing an ink composition, in which the ink jet recording apparatus includes an ink storage container having an ink pouring port; a height from an inner wall of the ink storage container facing the ink pouring port to the ink pouring port is 3 cm or more; the ink composition includes a self-dispersing pigment, a soap-free resin, and water; and when 15 g of the ink composition is weighed into a 50-mL sample bottle and the sample bottle is shaken 100 times for one minute, at 60 seconds after shaking, a foam height from a liquid level is 1 cm or less.

In the ink jet recording set, in the ink composition, a content A of the self-dispersing pigment may be 4.0% by mass or more and 8.0% by mass or less, a content B of the soap-free resin may be 1.5% by mass or more and 5.0% by mass or less, a total value F of the content A of the self-dispersing pigment and the content B of the soap-free resin may be 5.5% by mass or more and 11.0% by mass or less, and the ratio in percent by mass of the content A of the self-dispersing pigment to the content B of the soap-free resin, k=A/B, may be 3.0 or less.

DESCRIPTION OF EXEMPLARY EMBODIMENTS

Figure 1:
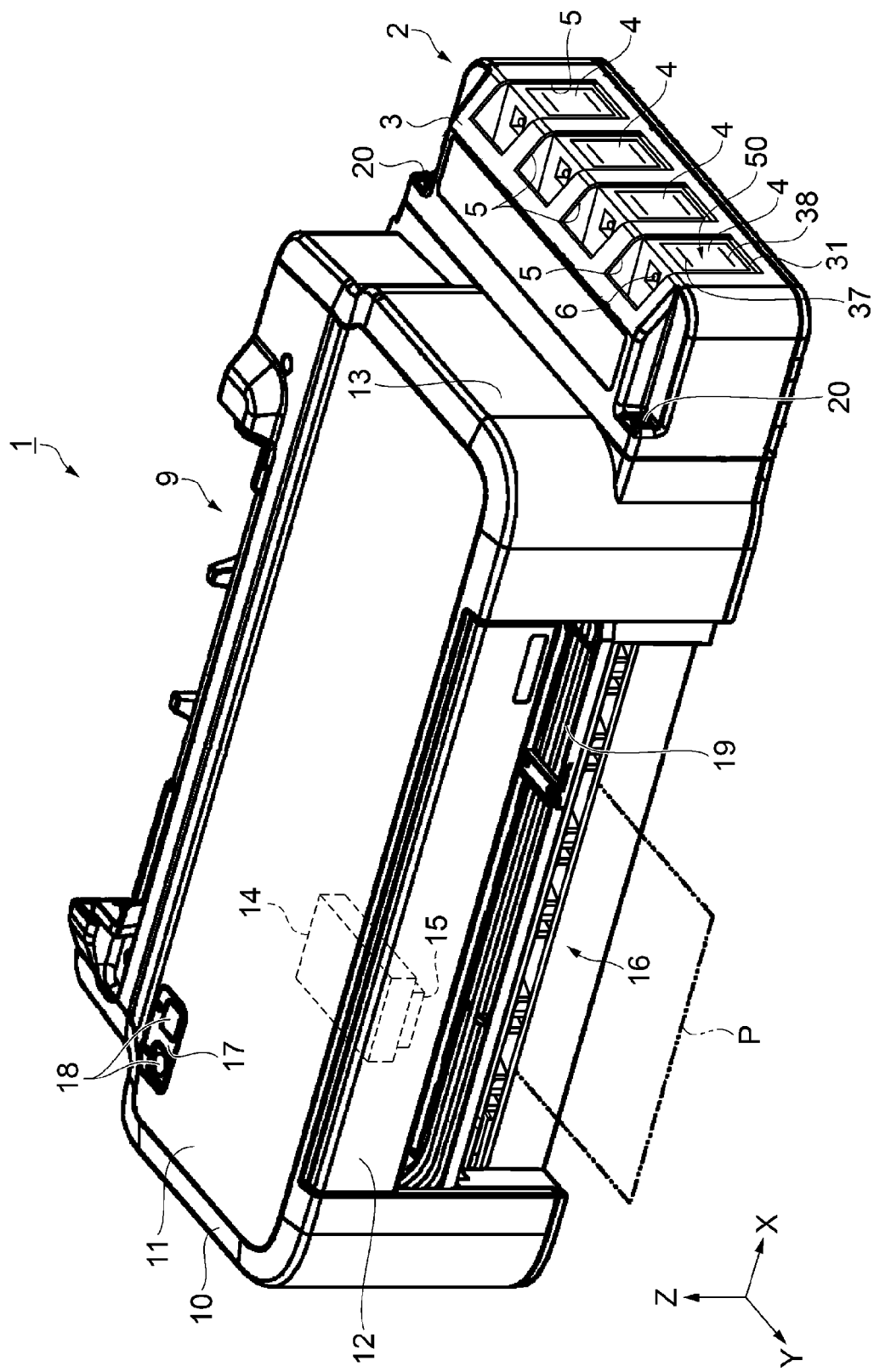
FIG. 1 is a perspective view showing an external appearance of an ink jet recording apparatus.

Embodiments of the present disclosure will be described below. However, the present disclosure is not limited to the following embodiments but may be implemented in various different forms without departing from the gist thereof.

Regarding an ink composition and an ink jet recording set according to the embodiments, the ink composition and a structure of the ink jet recording set will be described below in this order.

1. Ink Composition

An ink composition according to an embodiment of the present disclosure is an ink composition to be used in an ink jet recording apparatus, the ink composition including a self-dispersing pigment, a soap-free resin, and water, in which, when 15 g of the ink composition is weighed into a 50-mL sample bottle and the sample bottle is shaken 100 times for one minute, at 60 seconds after shaking, a foam height from a liquid level is 1 cm or less.

The ink composition according to this embodiment may include, in addition to the self-dispersing pigment, the soap-free resin, and water, an organic compound, a surfactant, a pH adjuster, an antioxidant/ultraviolet absorber, an antiseptic agent/antimold agent, an antirust agent, a chelating agent, a defoaming agent, and the like. When these materials are added, the performance of the ink composition can be further improved.

Regarding the ink composition (hereinafter, may be simply referred to as the "ink") according to this embodiment, a black ink composition and a color ink composition are taken as examples, and components contained in each of the ink compositions will be described in detail below.

1.1. Black Ink Composition

First, as an example of the ink composition according to this embodiment, a black ink composition containing a black pigment as a coloring material will be described.

1.1.1. Pigment

The ink composition according to this embodiment contains a pigment as a coloring material. Since the pigment has a property of being hardly faded by light, gas, and the like, when the pigment is used as a coloring material, in comparison with the case where a dye is used, a printed material having excellent image robustness, such as water resistance and line marker resistance, can be obtained. In the black ink composition according to this embodiment, a self-dispersing pigment is used as the pigment.

The self-dispersing pigment is a pigment capable of being dispersed and/or dissolved in an aqueous medium without a dispersant, such as a resin or surfactant. The phrase "dispersed and/or dissolved in an aqueous medium without a dispersant" implies that the pigment is stably present in the aqueous medium because of a hydrophilic group on the surface thereof, even if a dispersant that disperses the pigment is not used.

In the ink containing a self-dispersing pigment as a coloring material, it is not necessary to incorporate therein a dispersant that disperses the pigment, foam generation due to a decrease in the defoaming property, which is caused by the dispersant, hardly occurs, and an ink having excellent ejection stability can be easily prepared. Furthermore, since generation of foreign materials due to drying at the gas-liquid interface, which is caused by the dispersant, can be suppressed, excellent ejection reliability can be achieved. Since a significant increase in viscosity caused by the dispersant can also be suppressed, a larger amount of the pigment can be incorporated, and the print density can be sufficiently increased.

In this embodiment, the self-dispersing pigment used for the black ink composition is a self-dispersing pigment having a hydrophilic group on the surface thereof. The hydrophilic group is at least one hydrophilic group selected from the group consisting of —OM, —COOM, —CO—, —SO$_3$M, —SO$_2$M, —SO$_2$NH$_2$, —RSO$_2$M, —PO$_3$HM, —PO$_3$M$_2$, —SO$_2$NHCOR, —NH$_3$, and —NR$_3$. In the formulas, M represents a hydrogen atom, an alkali metal, ammonium, or an organic ammonium, and R represents an alkyl group having 1 to 12 carbon atoms or a naphthyl group which may have a substituent.

As a pigment serving as a raw material for the self-dispersing pigment used for the black ink composition, for example, carbon black manufactured by a known method, such as a contact method, furnace method, or thermal method, may be used. Specific examples of the carbon black suitable in this embodiment include No. 2300, No. 900, MCF88, No. 20B, No. 33, No. 40, No. 45, No. 52, MA7, MA8, MA100, and No. 2200B (which are manufactured by Mitsubishi Chemical Corporation); Color Black FW1, FW2, FW2V, FW18, FW200, S150, S160, S170, Printex 35, U, V, 140U, Special Black 6, 5, 4A, 4, and 250 (which are manufactured by Degussa); Conductex SC, Raven 1255, 5750, 5250, 5000, 3500, 1255, and 700 (which are manufactured by Columbia Carbon); and Regal 400R, 330R, 660R, Mogul L, Monarch 700, 800, 880, 900, 1000, 1100, 1300, 1400, and Elftex 12 (which are manufactured by Cabot Corporation). These carbon blacks may be used alone or as a mixture of two or more.

The self-dispersing pigment used for the black ink composition may be produced, for example, by performing physical treatment or chemical treatment on the pigment to bond (graft) a hydrophilic group to the surface of the pigment. As the physical treatment, for example, vacuum plasma treatment may be used. As the chemical treatment, for example, a wet oxidation method in which oxidation is performed in water using an oxidizing agent may be used.

Furthermore, in this embodiment, as the self-dispersing pigment, a black self-dispersing pigment which is surface-treated by oxidation treatment with a hypohalous acid and/or a salt of a hypohalous acid, oxidation treatment with ozone, or oxidation treatment with persulfuric acid and/or a persulfate salt is preferable from the viewpoint of a high color development property. Furthermore, as the self-dispersing pigment for the black ink composition, a commercially available product can also be used, and preferred examples thereof include Microjet CW1 (manufactured by Orient Chemical Industries Co., Ltd).

1.1.2. Organic Compound

The ink composition according to this embodiment may include an organic compound. When the ink composition includes the organic compound, the drying property of the ink composition ejected on a recording medium is improved, and a printed material having excellent image robustness can be obtained. Furthermore, when the organic compound is included, the pigment and resin particles are suppressed from being precipitated and formed into foreign materials due to drying of the ink. Therefore, in long-term printing using a continuous supply type ink storage container, generation of gas-liquid interface foreign materials is suppressed, thus improving continuous printing stability, and also improving the image robustness of an obtained printed material.

As the organic compound used for the ink composition, a water-soluble organic compound is preferable. When the water-soluble organic compound is used, in long-term printing using a continuous supply type ink storage container, generation of gas-liquid interface foreign materials is suppressed, thus improving continuous printing stability, and further improving the drying property of the ink composition. Accordingly, a printed material having excellent image robustness can be obtained.

The water-soluble organic compound is not particularly limited, but examples thereof include a polyol compound, a pyrrolidone derivative, a glycol ether, and a betaine.

Examples of the polyol compound include a polyol compound (preferably a diol compound) which has 2 to 6 carbon atoms in its molecule and which may have one ether bond in its molecule. Specific examples thereof include glycols, such as ethylene glycol, diethylene glycol, triethylene glycol, polyethylene glycol, propylene glycol, dipropylene glycol, tripropylene glycol, polypropylene glycol, polyoxyethylene polyoxypropylene glycol, trimethylolpropane, methyl triglycol (triethylene glycol monomethyl ether), butyl triglycol (triethylene glycol monobutyl ether), butyl diglycol (diethylene glycol monobutyl ether), dipropylene glycol monopropyl ether, glycerin, 1,2-hexanediol, 1,2-heptanediol, 1,3-propanediol, 1,2-butanediol, 1,3-butanediol, 1,4-butanediol, 2,3-butanediol, 2-methyl-3-phenoxy-1,2-propanediol, 3-(3-methylphenoxy)-1,2-propanediol, 3-hexyloxy-1,2-propanediol, 2-hydroxymethyl-2-phenoxymethyl-1,3-propanediol, 3-methyl-1,3-butanediol, 1,2-pentanediol, 1,5-pentanediol, 1,6-hexanediol, 2-methyl-2,4-pentanediol, and 3-methyl-1,5-pentanediol.

Among the polyol compounds, glycerin having a normal boiling point of 280° C. or higher or trimethylolpropane which is a solid organic compound at normal temperature is preferably used.

In addition, a so-called solid wetting agent may also be used as the organic compound. Examples thereof include saccharides, such as glucose, mannose, fructose, ribose, xylose, arabinose, galactose, aldonic acid, glucitol (sorbitol), maltose, cellobiose, lactose, sucrose, trehalose, and maltotriose, which are solid polyhydric alcohols at normal temperature; sugar alcohols; hyaluronic acids; and ureas.

In this specification, the term "normal temperature" means room temperature and a temperature of about 23° C.

The normal temperature is preferably 18° C. to 28° C., more preferably 20° C. to 26° C., and still more preferably 21° C. to 25° C.

Examples of the pyrrolidone derivative include N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone. These compounds may be used alone or as a mixture of two or more. The pyrrolidone derivative acts as a good solvent for resins. Accordingly, a recorded material having excellent abrasion resistance can be obtained, and clogging of a liquid ejecting head and nozzles can be prevented.

Example of the glycol ether include hexyl glycol, 2-ethylhexyl glycol, ethylene glycol monoisobutyl ether, ethylene glycol monohexyl ether, ethylene glycol monoisohexyl ether, diethylene glycol monohexyl ether, triethylene glycol monohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-methylpentyl ether, diethylene glycol mono-2-methylpentyl ether, propylene glycol monobutyl ether, dipropylene glycol monobutyl ether, tripropylene glycol monobutyl ether, propylene glycol monopropyl ether, dipropylene glycol monopropyl ether, tripropylene glycol monomethyl ether, diethylene glycol monophenyl ether, and tetraethylene glycol monobutyl ether. These compounds may be used alone or as a mixture of two or more. The glycol ether can, for example, control the wettability of the ink composition with respect to a recording medium.

The betaine, in a broad sense, may be a compound (dipolar ion) having stable positive and negative charges in its molecule and is a compound (intramolecular salt) which has a positive charge and a negative charge at positions which are not adjacent to each other in the same molecule and in which a dissociable hydrogen atom is not bound to an atom having a positive charge and the molecule as a whole has no charge. The betaine is preferably an N-alkyl substitution product of amino acid, and more preferably an N-trialkyl substitution product of amino acid. Examples of the betaine include trimethylglycine (also referred to as "glycine betaine"), γ-butyrobetaine, homarine, trigonelline, carnitine, homoserine betaine, valine betaine, lysine betaine, ornithine betaine, alanine betaine, stachydrine, and glutamic acid betaine. In particular, trimethylglycine is preferable.

1.1.3. Water

In this embodiment, the ink composition contains water. Water is a main medium of the ink composition and is a component which is evaporated and scattered by drying. Water is preferably pure water, such as ion-exchanged water, ultrafiltration water, reverse osmosis water, or distilled water, or ultrapure water in which ionic impurities are removed as much as possible. Furthermore, when water which is sterilized, for example, by ultraviolet irradiation or by addition of hydrogen peroxide is used, in a case where the ink composition is stored for a long time, generation of mold and bacteria can be prevented, which is preferable.

The content of water, relative to the total mass of the ink composition, is preferably 50% by mass or more, more preferably 60% by mass or more, and particularly preferably 65% by mass or more.

When the content of water in the ink composition is set in the range described above, since the amount of water absorbed by cellulose in coated paper is decreased compared to that of an ink composition of the related art, swelling of cellulose that is considered to cause cockling and curling can be suppressed. Therefore, the ink composition according to this embodiment is also useful for a recording medium, such as plain paper or printing coated paper (printing paper), having an absorption layer on a paper support which has a poor ink absorbing property.

1.1.4. Soap-Free Resin

In this embodiment, the ink composition contains a resin emulsion which is referred to as a soap-free resin. As the ink is dried, resin particles in the resin emulsion fuse together and the resin particles and a color component fuse together to allow the pigment to adhere to a recording medium. Therefore, the resin emulsion acts to improve the fixing property of an image portion of a recorded material, and the image robustness of an obtained printed material is improved. Furthermore, when a resin serving as a binder is incorporated in an emulsion state in the ink composition, the viscosity of the ink composition can be easily controlled within an appropriate range in an ink jet recording method, and the ink composition can have excellent storage stability and ejection stability.

The term "resin emulsion" means an emulsion in which a resin component hardly soluble or insoluble in a liquid medium of the ink composition, in the form of fine particles, is dispersed in the liquid medium of the ink composition, and the resin particles constituting the resin emulsion is incorporated in an emulsion state in the ink composition.

Resin particles that can be used for the resin emulsion are preferably formed of one or two or more resins selected from the group consisting of an acrylic resin, a methacrylic resin, a styrene resin, a urethane resin, an acrylamide resin, and an epoxy resin. These resins may be used either as a homopolymer or as a copolymer.

In this embodiment, as the resin particles, resin particles having a single-particle structure can be used. On the other hand, in this embodiment, resin particles having a core-shell structure including a core portion and a shell portion surrounding the core portion can also be used. In this specification, the term "core-shell structure" means a "structure in which two or more polymers having different compositions are present in separate phases". Accordingly, the core-shell structure is not limited to a structure in which the shell portion completely covers the core portion, but may be a structure in which the shell portion partially covers the core portion. Furthermore, the core-shell structure may be a structure in which a shell portion polymer partially forms a domain or the like in a core particle. Furthermore, the core-shell structure may be a multilayer structure including three or more layers in which one or more layers are disposed between the core portion and the shell portion.

In this embodiment, as the resin emulsion, a soap-free resin which does not substantially contain an anionic surfactant that is likely to cause foaming of an ink is used. The phrase "does not substantially contain an anionic surfactant" implies that the content of an anionic surfactant in a resin emulsion solution is desirably 1% by mass or less. Examples of the anionic surfactant include sodium dodecylbenzene sulfonate, sodium laurate, and ammonium salts of polyoxyethylene alkyl ether sulfate.

1.1.5. Method for Producing Soap-Free Resin

The method for producing the soap-free resin is not particularly limited except that an emulsifier is not substantially used. Examples of the method for producing the soap-free resin include a method in which a core-shell resin is produced by soap-free polymerization. The soap-free polymerization refers to a polymerization process for producing a polymer without substantially using a surfactant used in synthesis. Here, the "surfactant used in synthesis" means an emulsifier. In the soap-free polymerization, for example, polymer particles may be polymerized in the presence of an emulsifier in which the content of the emulsifier in a solution is 1% by mass or less. In the related art, the ink composition containing polymer particles synthesized using such an emulsifier is problematic in that foaming is likely to occur, it is difficult to obtain a glossy image, and foreign materials are easily generated. According to an aspect of the present disclosure, an ink composition in which such problems are suppressed can be obtained. In the soap-free polymerization, for example, a shell polymer containing (meth)acrylic acid as a constitutional unit is formed, and a core is formed in the shell polymer. Furthermore, in a case where polymer particles are formed using soap-free polymerization, the average particle size is greatly decreased, and the ejection stability and glossiness of the ink composition are improved.

The surfactant used in synthesis is not particularly limited, but an anionic surfactant and a nonionic surfactant are suitable. Examples of the anionic surfactant include sodium dodecylbenzene sulfonate, sodium laurate, and ammonium salts of polyoxyethylene alkyl ether sulfate. Examples of the nonionic surfactant include polyoxyethylene alkyl ethers, polyoxyethylene alkyl esters, polyoxyethylene sorbitan fatty acid esters, polyoxyethylene alkyl phenyl ethers, polyoxyethylene alkyl amines, and polyoxyethylene alkyl amides. The core-shell polymer used in the present embodiment is produced without using these surfactants.

The polymerization initiator used in the soap-free polymerization is not particularly limited, but is preferably a hydrophilic initiator. Examples thereof include potassium persulfate, ammonium persulfate, and hydrogen peroxide.

An example of the soap-free polymerization method will be described below, but the synthesis method is not limited thereto. For example, ion-exchanged water and a polymerization initiator are introduced into a polymerization reactor equipped with a jacket. In the polymerization reactor, oxygen is removed under reduced pressure, and then the pressure therein is brought back to atmospheric pressure using nitrogen. In the nitrogen atmosphere, first, the temperature in the polymerization reactor is set to a predetermined temperature, and then, by dropwise addition of a certain amount of a pre-emulsion solution containing monomers, which serve as constituents of a shell polymer, a polymerization reaction is performed to synthesize a shell polymer. Next, a core polymer is obtained by polymerization using a void of the resulting shell polymer as a polymerization field, thereby synthesizing polymer particles according to this embodiment. Specifically, a monomer mixture containing the hydrophobic monomers is added dropwise into an aqueous dispersion medium containing a shell polymer to obtain a core polymer by polymerization, and polymer particles are formed. In such a manner, when a shell polymer is used as the polymerization field of a core polymer, there is no need to use an emulsifier in the monomer mixture.

According to such soap-free polymerization, the content of an emulsifier in the ink composition can be easily set to 0.01% by mass or less, and the average particle size of the polymer particles can also be set very small.

From the viewpoint of the long-term storage stability and ejection stability of the ink composition, in this embodiment, the volume average particle size of the resin particles is preferably in a range of 5 to 400 nm, and more preferably in a range of 50 to 200 nm.

1.1.6. Surfactant

In this embodiment, the ink composition preferably contains a surfactant. Above all, from the viewpoint of obtaining an ink composition in which the amount of foam generation or foaming is small, a nonionic surfactant is particularly preferable.

Specific examples of the nonionic surfactant include acetylene glycol surfactants; acetylene alcohol surfactants; ethers, such as polyoxyethylene nonylphenyl ether, polyoxyethylene octylphenyl ether, polyoxyethylene dodecylphenyl ether, polyoxyethylene alkylallyl ethers, polyoxyethylene oleyl ether, polyoxyethylene lauryl ether, polyoxyethylene alkyl ethers, and polyoxyalkylene alkyl ethers; esters, such as polyoxyethylene oleate, polyoxyethylene oleate ester, polyoxyethylene distearate ester, sorbitan laurate, sorbitan monostearate, sorbitan monooleate, sorbitan sesquioleate, polyoxyethylene monooleate, and polyoxyethylene stearate; polyether-modified siloxane surfactants, such as dimethylpolysiloxane; and fluorine-containing surfactants, such as fluorinated alkyl esters and perfluoroaklyl carboxylic acid salts. These nonionic surfactants may be used alone or in combination of two or more.

Among the nonionic surfactants described above, in particular, an acetylene glycol surfactant and/or a polyether-modified siloxane surfactant is preferable from the viewpoint that the amount of foam generation is small, and an excellent defoaming property is exhibited.

Specific examples of the acetylene glycol surfactant include 2,4,7,9-tetramethyl-5-decyne-4,7-diol, 3,6-dimethyl-4-octyne-3,6-diol, and 3,5-dimethyl-1-hexyne-3-ol. A commercially available product may also be used, and examples thereof include Surfynol 104, 82, 465, 485, and TG manufactured by Air Products and Chemicals, Inc., and Olfine STG and Olfine E1010 manufactured by Nissin Chemical Industry Co., Ltd. More specific examples of the polyether-modified siloxane surfactant include BYK-345, BYK-346, BYK-347, BYK-348, and UV3530 manufactured by BYK Japan KK. These surfactants may be used in combination of two or more in the ink composition. The surface tension of the surfactant is preferably controlled to 20 to 40 mN/m, and the content thereof in the ink composition is 0.1% to 3.0% by mass.

1.1.7. pH Adjuster

In this embodiment, the black ink composition may further contain a pH adjuster. As the pH adjuster, for example, an alkali hydroxide, such as lithium hydroxide, potassium hydroxide, or sodium hydroxide, ammonia, and/or an alkanolamine, such as triethanolamine, tripropanolamine, diethanolamine, or monoethanolamine, may be used. In particular, preferably, the ink composition contains at least one pH adjuster selected from a hydroxide of an alkali metal, ammonia, triethanolamine, and tripropanolamine, and the pH is adjusted to a range of 6 to 10. When the pH is out of this range, materials constituting the ink jet recording apparatus may be adversely affected, and the clogging recovery property may be degraded in some cases.

Furthermore, as necessary, collidine, imidazole, phosphoric acid, 3-(N-morpholino)propane sulfonic acid, tris (hydroxymethyl)aminomethane, boric acid, or the like may be used as a pH buffer.

1.1.8. Other Components

In this embodiment, the black ink composition may further contain an antioxidant, an ultraviolet absorber, an antiseptic agent, an antimold agent, an antirust agent, a chelating agent, a defoaming agent, and the like. When these materials are added, the performance of the ink composition can be further improved.

Examples of the antioxidant or ultraviolet absorber that can be used include allophanates, such as allophanate and methyl allophanate; biurets, such as biuret, dimethyl biuret, and tetramethyl biuret; L-ascorbic acid and salts thereof; Tinuvin 328, 900, 1130, 384, 292, 123, 144, 622, 770, and 292, Irgacor 252 and 153, Irganox 1010, 1076, 1035, and MD1024 which are manufactured by Ciba-Geigy AG; and lanthanide oxides.

Examples of the antiseptic agent or antimold agent include sodium benzoate, sodium pentachlorophenol, sodium 2-pyridinethiol-1-oxide, sodium sorbate, sodium dehydroacetate, and 1,2-dibenzisothiazolin-3-one. As commercially available products, for example, Proxel XL2 and Proxel GXL (trade names, manufactured by Avecia Corp.) and Denicide CSA and NS-500W (trade names, manufactured by Nagase ChemteX Corporation) may be used.

Examples of the antirust agent include benzotriazole.

Examples of the chelating agent include ethylenediaminetetraacetic acid and salts thereof (such as disodium dihydrogen ethylenediaminetetraacetate).

1.1.9. Method for Preparing Ink Composition

In this embodiment, the black ink composition is obtained by mixing the components described above in an arbitrary order and, as necessary, by removing impurities by filtration or the like. As the method of mixing the components, a method in which the materials are sequentially added into a vessel equipped with a stirring device, such as a mechanical stirrer or magnetic stirrer, and then stirring and mixing are performed is suitably used. As a filtration method, centrifugal filtration, filter filtration, or the like may be performed as necessary.

1.1.10. Physical Properties of Ink Composition

In the black ink composition according to this embodiment, a self-dispersing pigment and a soap-free resin are used. Therefore, in comparison with the case where a resin dispersion type pigment is used, it is possible to provide an ink composition in which foaming can be reduced when the ink composition is poured into an ink storage container of an ink jet recording apparatus.

Furthermore, in this embodiment, from the viewpoint of the balance between image quality and reliability as an ink for ink jet recording, the surface tension of the black ink composition at 20° C. is preferably 20 mN/m or more and 40 mN/m or less, and more preferably 20 mN/m or more and 35 mN/m or less. Note that the surface tension can be measured, for example, by checking a surface tension when a platinum plate is wetted with the ink in an environment of 20° C. by using an automatic surface tension meter CBVP-Z (trade name, manufactured by Kyowa Interface Science Co., Ltd).

Furthermore, from the same viewpoint, in this embodiment, the viscosity of the black ink composition at 20° C. is preferably 3 mPa·s or more and 10 mPa·s or less, and more preferably 3 mPa·s or more and 8 mPa·s or less. Note that the viscosity can be measured, for example, by measuring a shear viscosity at a shear rate of 200 $s^{-1}$ in an environment of 20° C. by using a viscoelasticity meter MCR-300 (trade name, manufactured by Pysica).

1.1.11. Application

According to this embodiment, regarding the black ink composition, when the ink is poured into a continuous supply type ink storage container, foaming of the ink can be suppressed, and the time required until foam disappears is shorter than that in the related art. Therefore, printing can be performed promptly after the ink composition is poured into the ink storage container. Furthermore, the ink composition can provide a printed material having excellent robustness of an image printed by an ink jet recording apparatus, and a recording medium on which printing is performed is not particularly limited.

1.2. Color Ink Composition

As another example of the ink composition according to this embodiment, a color ink composition containing a color pigment as a coloring material will be described.

In this specification, the color ink composition specifically includes a yellow ink composition, a magenta ink composition, and a cyan ink composition. Furthermore, red, green, blue, orange, and violet ink compositions can also be used in order to expand the color reproduction range.

1.2.1. Pigment

In this embodiment, a coloring material that can be used in the color ink composition is a self-dispersing pigment capable of being dispersed and/or dissolved in water without a dispersant, as in the pigment of the black ink composition.

In the case where the pigment contained in the color ink composition of this embodiment is a self-dispersing pigment having a hydrophilic group on the surface thereof with a phenyl group interposed therebetween, the hydrophilic group is preferably at least one hydrophilic group selected from the group consisting of —OM, —COOM, —CO—, —SO$_3$M, —SO$_2$M, —SO$_2$NH$_2$, —RSO$_2$M, —PO$_3$HM, —PO$_3$M$_2$, —SO$_2$NHCOR, —NH$_3$, and —NR$_3$. In the formulas, M represents a hydrogen atom, an alkali metal, ammonium, or an organic ammonium, and R represents an alkyl group having 1 to 12 carbon atoms or a naphthyl group which may have a substituent.

Examples of a pigment serving as a raw material for the self-dispersing pigment used for the color ink composition include pigments, such as Pigment Yellow, Pigment Red, Pigment Violet, Pigment Blue, and Pigment Black, described in Color index; and phthalocyanine-based pigments, azo-based pigments, anthraquinone-based pigments, azomethine-based pigments, and condensed ring-based pigments. Other examples include organic pigments, such as Yellow No. 4, No. 5, No. 205, and No. 401, Orange No. 228 and No. 405, and Blue No. 1 and No 404; and inorganic pigments, such as titanium oxide, zinc oxide, zirconium oxide, iron oxide, ultramarine blue, Prussian blue, and chromium oxide. Specific examples thereof include C.I. Pigment Yellow 1, 3, 12, 13, 14, 17, 24, 34, 35, 37, 42, 53, 55, 74, 81, 83, 95, 97, 98, 100, 101, 104, 108, 109, 110, 117, 120, 128, 138, 150, 153, 155, 174, 180, and 198, C.I. Pigment Red 1, 3, 5, 8, 9, 16, 17, 19, 22, 38, 57:1, 90, 112, 122, 123, 127, 146, and 184, C.I. Pigment Violet 1, 3, 5:1, 16, 19, 23, and 38, and C.I. Pigment Blue 1, 2, 15, 15:1, 15:2, 15:3, 15:4, and 16. In particular, the organic pigment contained in the yellow ink composition preferably contains at least one selected from the group consisting of C.I. Pigment Yellow 74, 109, 110, 128, 138, 147, 150, 155, 180, and 188; the organic pigment contained in the magenta ink composition preferably contains at least one selected from the group consisting of C.I. Pigment Red 122, 202, 207, 209, and C.I. Pigment Violet 19; and the organic pigment contained in the cyan ink composition preferably contains at least one selected from the group consisting of C.I. Pigment Blue 15, 15:1, 15:2, 15:3, 15:4, and 16.

On the other hand, the self-dispersing pigment of the color ink composition is produced by bonding a hydrophilic group to the surface of a pigment with a phenyl group interposed therebetween. As a surface treatment method in which the functional group or a salt thereof, which is a hydrophilic group, is bonded to the surface of a pigment with a phenyl group interposed therebetween, various known surface treatment methods may be used, such as a method in which by bonding sulfanilic acid, p-aminobenzoic acid, 4-aminosalicylic acid, or the like to the surface of the pigment, a hydrophilic group is bonded thereto with a phenyl group interposed therebetween.

As the self-dispersing pigment of the color ink composition, a commercially available product may also be used, and examples thereof include CAB-O-JET250C, CAB-O-JET260M, and CAB-O-JET270Y (which are manufactured by Cabot Corporation).

1.2.2. Others

Furthermore, in this embodiment, as in the black ink composition, the color ink composition includes a soap-free resin and water. Since the specific examples thereof are the same as those of the black ink composition, a description thereof will be omitted.

Furthermore, in this embodiment, as in the black ink composition, as necessary, other additives may be added to the color ink composition. Since the specific examples thereof are the same as those of the black ink composition, a description thereof will be omitted. Furthermore, in this embodiment, since the physical properties of the color ink composition are the same as those of the black ink composition, a description thereof will be omitted. Furthermore, in this embodiment, since the application of the color ink composition is the same as that of the black ink composition, a description thereof will be omitted.

1.3. Ink Jet Recording Set

An ink jet recording set according to this embodiment includes an ink jet recording apparatus and an ink supply container containing an ink composition. The ink jet recording apparatus includes an ink storage container having an ink pouring port, and a height from an inner wall of the ink storage container facing the ink pouring port to the ink pouring port is 3 cm or more. The ink composition includes a self-dispersing pigment, a soap-free resin, and water. When 15 g of the ink composition is weighed into a 50-mL sample bottle and the sample bottle is shaken 100 times for one minute, at 60 seconds after shaking, a foam height from a liquid level is 1 cm or less. The constitution of the ink jet recording set will be described below.

1.3.1. Ink Jet Recording Apparatus

An ink jet recording apparatus according to this embodiment will be described in detail with reference to the drawings. In order to facilitate understanding of the structure of the ink jet recording apparatus according to this embodiment, the scale may be appropriately changed in some cases.

1.3.1.1. External Appearance

Figure 2:
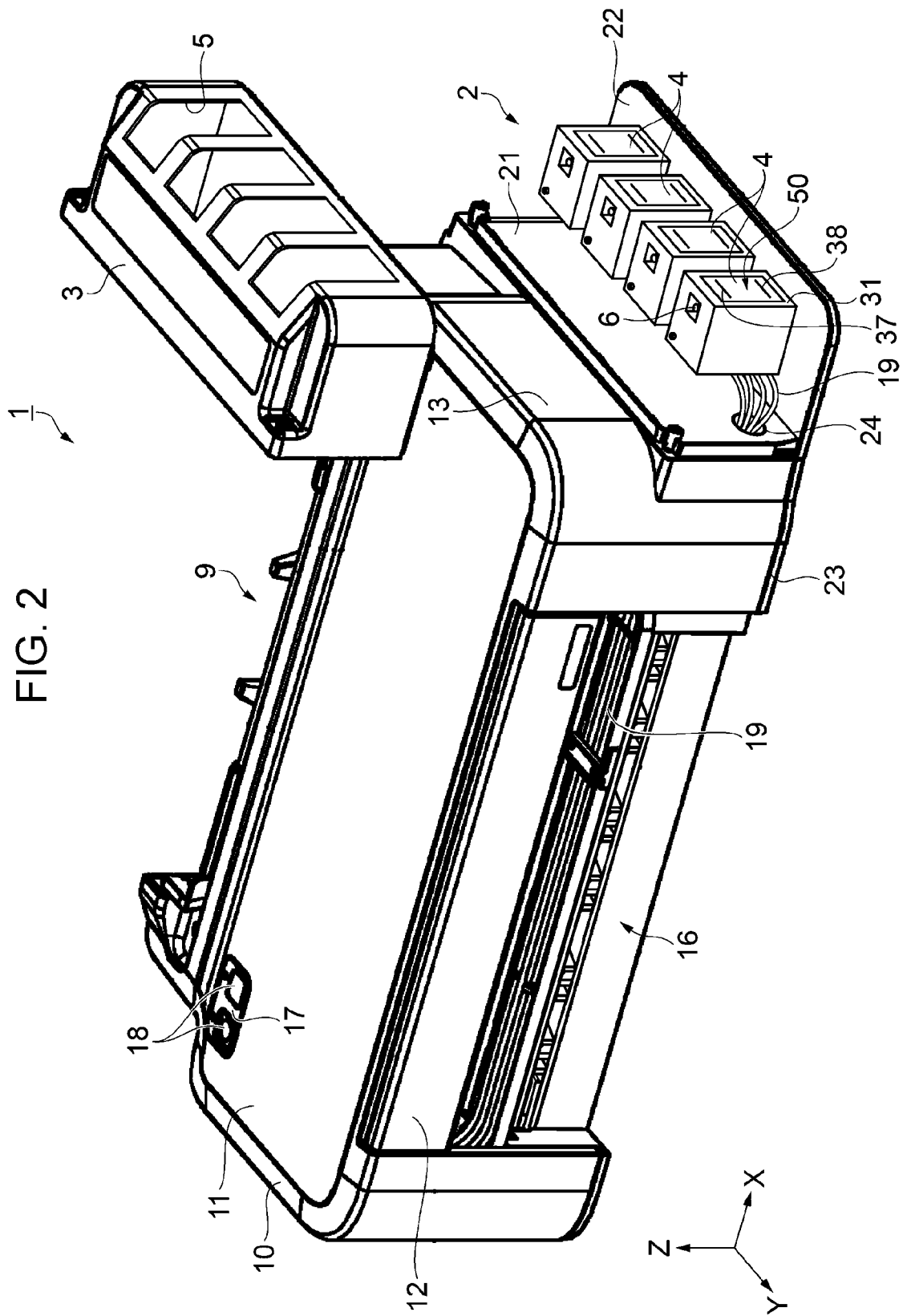
FIG. 2 is a perspective view showing an external appearance of the ink jet recording apparatus in a state where a cover for ink tanks is detached.

FIG. 1 is a perspective view showing an external appearance of an ink jet recording apparatus. FIG. 2 is a perspective view showing an external appearance of the ink jet recording apparatus in a state where a cover for ink tanks is detached. In FIGS. 1 and 2, X, Y, and Z axes orthogonal to each other are shown. As necessary, the X, Y, and Z axes are also shown in the subsequent drawings. In this embodiment, the X axis corresponds to a moving direction of a carriage 14, and the Y axis corresponds to a direction in which a plurality of ink tanks 4 are arranged in the use state. The Z axis corresponds to a vertical direction (gravity direction).

An ink jet recording apparatus 1 includes an apparatus body 9 in which a liquid ejecting head 15 is housed in a body case 10 and printing is performed on a sheet of paper P, and a tank unit 2 in which ink tanks 4 serving as ink storage containers are housed in a tank case 3 and which supplies ink to the liquid ejecting head 15. The tank unit 2 is provided on a side face 13 of the body case 10.

The carriage 14 is fixed to an endless belt (not shown) that is rotated by driving of a carriage motor (not shown), and reciprocally moves in a main scanning direction (X-axis direction) while being guided by a guide portion (not shown) extending in the X-axis direction. The liquid ejecting head 15 is provided at a lower part of the carriage 14 and reciprocally moves in the main scanning direction.

In this embodiment, four ink tanks 4, which contain black ink, yellow ink, magenta ink, and cyan ink, are housed in the tank case 3 while being arranged in the Y-axis direction. Openings 5 are formed at four positions of the tank case 3, and each ink tank 4 is partially exposed through the corresponding opening 5.

A transport motor and a pair of transport rollers that are driven to rotate by the transport motor, which are not shown, are provided in the apparatus body 9, and the sheet of paper P is pinched between the pair of transport rollers and transported in a sub-scanning direction (Y-axis positive direction). The liquid ejecting head 15 ejects ink toward the sheet of paper P which is being transported, while reciprocally moving in the main scanning direction, thereby performing printing on the sheet of paper P. The sheet of paper P on which printing has been performed by the liquid ejecting head 15 is discharged from a paper discharge port 16 provided at a lower part of the body case 10 on the front face 12 side.

An operation panel 17 is provided on a top face 11 of the body case 10 on the back face side (in the Y-axis negative direction), and operation buttons 18 configured to turn on/off the power supply and set conditions for printing and the like are provided on the operation panel 17.

Liquid supply tubes 19 are arranged above the paper discharge port 16, one end of each of the liquid supply tubes 19 being connected to one of the ink tanks 4, the other end being connected to the liquid ejecting head 15. The inks contained in the ink tanks 4 are supplied via the liquid supply tubes 19 to the liquid ejecting head 15.

FIG. 2 is a perspective view of the ink jet recording apparatus 1 in a state where the tank case 3 serving as a cover for the ink tanks 4 is detached from the body case 10 by removing screws 20 shown in FIG. 1. The four ink tanks 4 are arranged side by side in the Y-axis direction on a bottom wall 22 of the tank unit 2, the bottom wall 22 being located at a position on the same horizontal plane as a bottom wall 23 of the body case 10.

A wall portion 21 for installing the tank case 3 is provided on the side face 13 of the body case 10. A through hole 24 is provided in the wall portion 21. The liquid supply tubes 19 are arranged from the ink tanks 4 toward the inside of the body case 10 so as to pass through the through hole 24.

1.3.1.2. Storage Container

Figure 3:
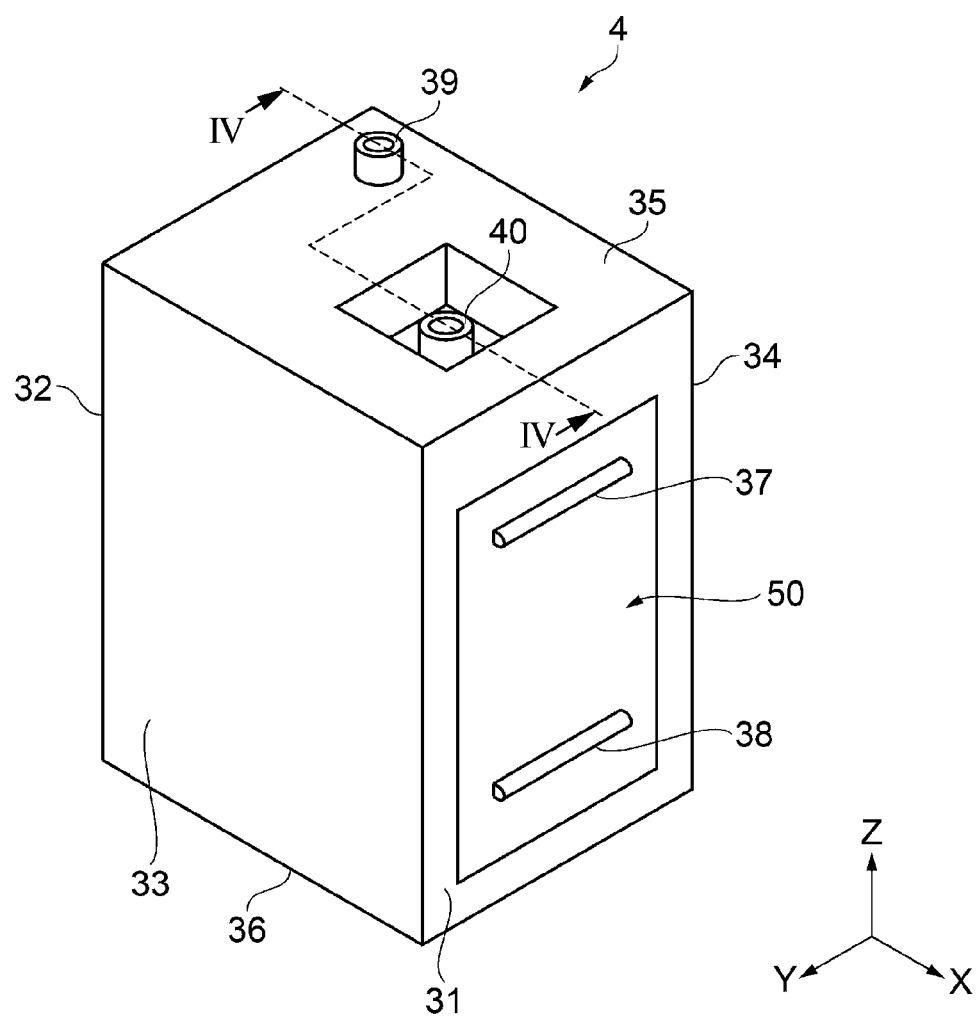
FIG. 3 is a perspective view showing an external appearance of an ink tank.

FIG. 3 is a perspective view showing an external appearance of an ink tank. As shown in FIG. 3, outer wall portions of an ink tank 4 serving as an ink storage container include an upper wall 35 and a bottom wall 36 that are opposed to each other in the Z-axis direction, a first side wall 31 and a second side wall 32 that are opposed to each other in the X-axis direction, and a third side wall 33 and a fourth side wall 34 that are opposed to each other in the Y-axis direction. The external shape of the ink tank 4 is substantially rectangular parallelepiped.

Figure 4:
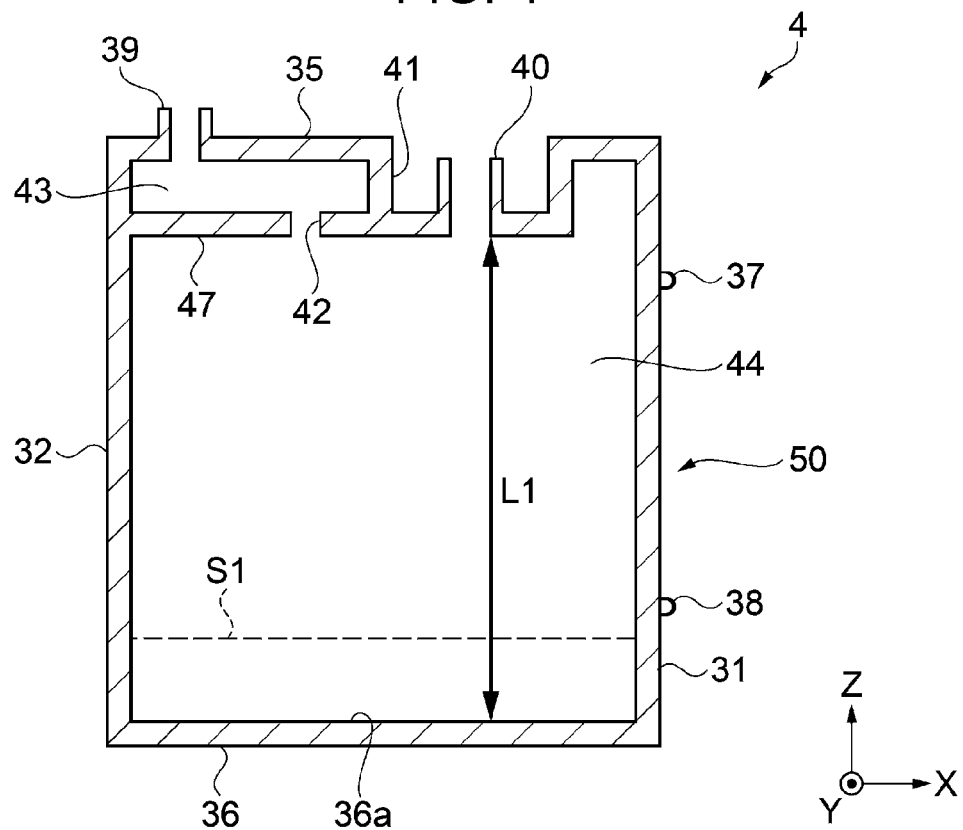
FIG. 4 is a cross-sectional view showing a structure of the ink storage container taken along the line IV-IV of FIG. 3, as viewed in the arrow direction.

FIG. 4 is a cross-sectional view showing a structure of the ink tank taken along the line IV-IV of FIG. 3, as viewed in the arrow direction. Note that the line IV-IV is a line segment that crosses a communicating port 39 and an ink pouring port 40, which will be described later, when the ink tank 4 is viewed from above. As shown in FIG. 4, the ink pouring port 40 is provided in an upper part of the ink tank 4. The ink pouring port 40 is provided in a recessed portion 41 which is recessed downward from the upper wall 35. The recessed portion 41 functions as an ink-receiving portion which receives therein the ink that has spills from the ink pouring port 40 or the ink that has dripped from the ink pouring port 40 when the user pours the ink, and prevents the ink from flowing downward from the recessed portion 41.

An air containing portion 43 is formed in an upper part of the ink tank 4. The air containing portion 43 is a space region surrounded by wall portions, such as the upper wall 35, an upper portion of the second side wall 32, the recessed portion 41, and a partition wall 47 extending in the horizontal direction. The air containing portion 43 is made open to the atmosphere by the communicating port 39 provided in the upper wall 35 shown in FIG. 3.

A liquid containing portion 44 is provided below the air containing portion 43. The liquid containing portion 44 is a space region surrounded by wall portions, such as the bottom wall 36, the first side wall 31, the second side wall 32, and the partition wall 47. The liquid containing portion 44 is in communication with the air containing portion 43 through a communicating port 42 provided in the partition wall 47.

The first side wall 31 constitutes a liquid visual recognition portion 50 formed of a translucent resin. This enables the user to visually check the liquid level of the ink contained in the liquid containing portion 44 of the ink tank 4 through the liquid visual recognition portion 50. An upper limit mark 37 and a lower limit mark 38 are disposed in the Y-axis direction with a distance therebetween on the liquid visual recognition portion 50. The upper limit mark 37 is an indicator showing the position of the liquid level of the maximum amount of ink that is to be appropriately contained in the liquid containing portion 44. The lower limit mark 38 is an indicator showing the position of the liquid level of the minimum amount of ink that is to be appropriately contained in the liquid containing portion 44. The upper limit mark 37 and the lower limit mark 38 may be formed by attaching tap-shaped members or by printing.

Figure 5:
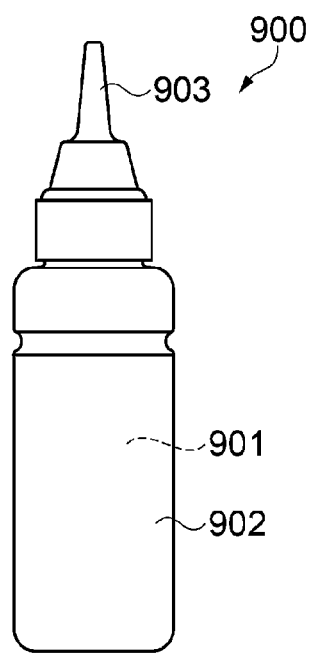
FIG. 5 is a side view showing an external appearance of an ink supply container.

When it is visually recognized that the position of a liquid level S1 of the ink contained in the liquid containing portion 44 of the ink tank 4 shown in FIG. 4 is located below the lower limit mark 38, the user removes a cap 6 (refer to FIG. 2) of the ink tank 4, inserts an ink supply port 903 of an ink supply container 900, which is shown in FIG. 5, into the ink pouring port 40 of the ink tank 4, and pours an ink 901 contained in the ink supply container 900 into the liquid containing portion 44 of the ink tank 4.

With the pouring of the ink 901, the position of the liquid level S1 of the ink 901 in the liquid containing portion 44 rises. When it is visually recognized through the liquid visual recognition portion 50 that the position of the liquid level S1 of the ink 901 rises and reaches the position of the upper limit mark 37, the user stops the operation of pouring the ink 901 from the ink supply container 900.

In this embodiment, in the ink tank 4, a height L1 from an inner wall 36a of the bottom wall 36 facing the ink pouring port 40 to the lower end of the ink pouring port 40 is 3 cm or more.

1.3.2. Ink Supply Container

In this embodiment, an ink supply container is used to pour ink into the ink tank 4. The ink supply container according to this embodiment will be described in detail with reference to FIG. 5. In order to facilitate understanding of the structure of the ink supply container according to this embodiment, the scale may be appropriately changed in some cases. FIG. 5 is a side view showing an external appearance of the ink supply container, and FIG. 6 is a view illustrating a state in which ink is poured into an ink tank.

As shown in FIG. 5, an ink supply container 900 according to this embodiment includes an ink supply container body 902 configured to contain an ink 901, and an ink supply port 903 which is provided on the top end side of the ink supply container body 902 and constitutes an ink outlet.

The ink supply container 900 according to this embodiment is formed, for example, by stretch blow molding, using a synthetic resin, such as polypropylene, polyethylene, or polyethylene terephthalate.

Figure 6:
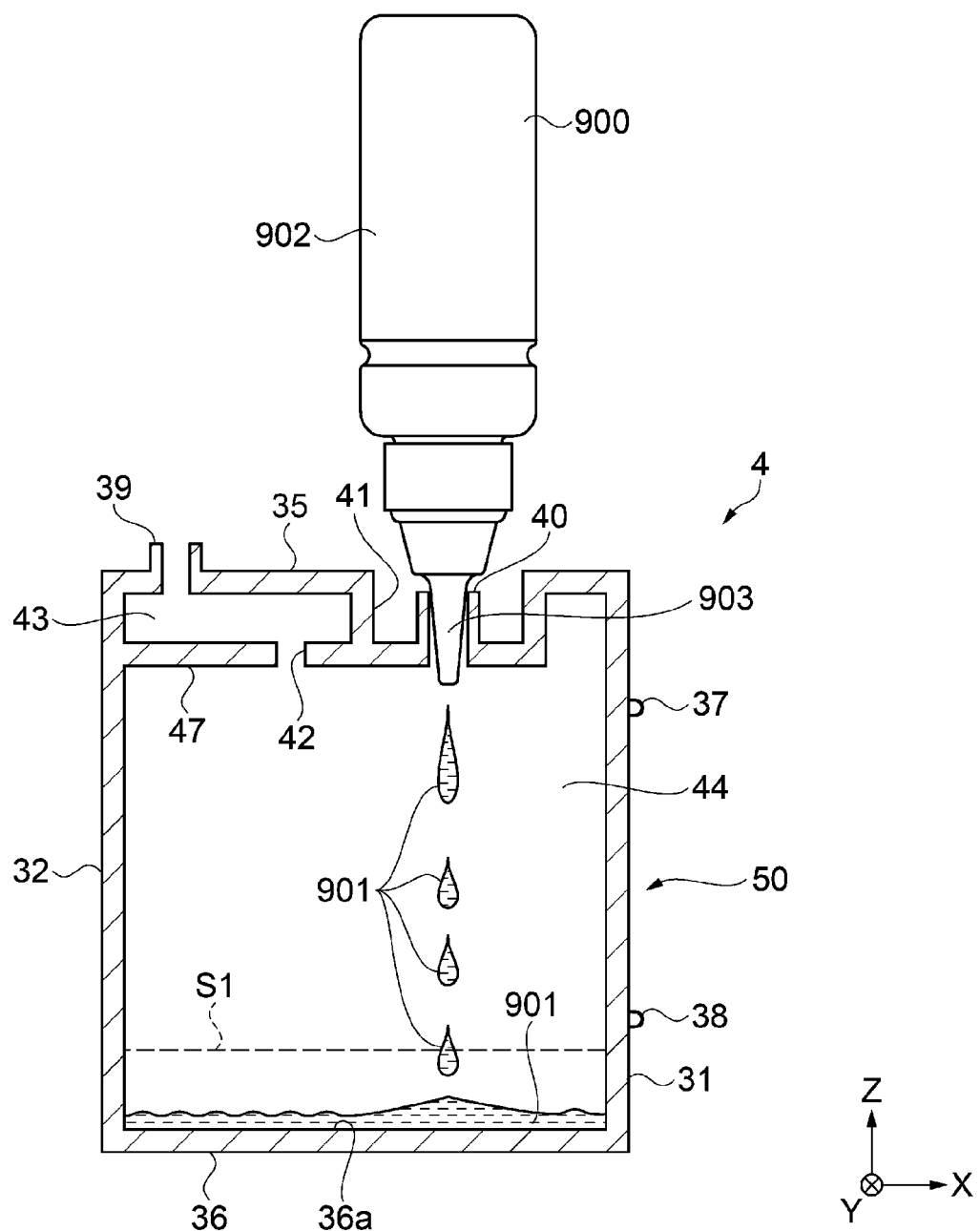
FIG. 6 is a view illustrating a state in which ink is poured into an ink tank.

In this embodiment, as shown in FIG. 6, the user holds the ink supply container 900 upside down, inserts the ink supply port 903 of the ink supply container 900 into the ink pouring port 40, and presses the ink supply container body 902, thereby feeding the ink 901 into the liquid containing portion 44.

2. Examples and Comparative Examples of Ink Composition

Hereinafter, the ink composition will be described specifically on the basis of examples and comparative examples. It is to be understood that the ink composition according to the present disclosure is not limited to the examples.

2.1. Preparation of Ink Composition

Table 1 shows the amounts of components of ink compositions in examples, and Table 2 shows the amounts of components of ink compositions in comparative examples. The components in the amounts shown in Tables 1 and 2 were mixed and stirred, followed by pressure filtration using a membrane filter having a pore size of 10 μm, to obtain ink compositions in Examples 1 to 7 and ink compositions in Comparative Examples 1 to 9. Note that the values in Tables 1 and 2 each represent the content (% by mass) of the component relative to the total mass of the ink composition, and water was added so that the total mass of the ink composition became 100% by mass. Furthermore, regarding the pigment and the resin emulsion, values in terms of solid content are shown.

TABLE 1

| | | Example 1 | Example 2 | Example 3 | Example 4 | Example 5 | Example 6 | Example 7 |
|---|---|---|---|---|---|---|---|---|
| Ink composition | | | | | | | | |
| Self-dispersing pigment solid content mass %; (A) | | 6.0 | 6.0 | 6.0 | 4.0 | 4.0 | 4.0 | 8.0 |
| Soap-free resin solid content mass %; (B) | | 3.0 | 2.0 | 5.0 | 3.0 | 1.5 | 5.0 | 3.0 |
| Resin-coated pigment solid content of pigment mass %; (C) | | | | | | | | |
| Non soap-free resin solid content mass %; (D) | | | | | | | | |
| Resin-coated pigment solid content of added resin mass %; (E) | | | | | | | | |
| Total solid content (F) = (A) + (B) + (C) + (D) + (E) | | 9.0 | 8.0 | 11.0 | 7.0 | 5.5 | 9.0 | 11.0 |
| k = A/B | | 2.0 | 3.0 | 1.2 | 1.3 | 2.7 | 0.8 | 2.7 |
| Glycerin | | 5.0 | 5.0 | 5.0 | 5.0 | 5.0 | 5.0 | 5.0 |
| Trimethylolpropane | | 3.0 | 3.0 | 3.0 | 3.0 | 3.0 | 3.0 | 3.0 |
| Triethylene glycol | | 2.0 | 2.0 | 2.0 | 2.0 | 2.0 | 2.0 | 2.0 |
| Trimethylglycine (amino coat) | | 5.0 | 5.0 | 5.0 | 5.0 | 5.0 | 5.0 | 5.0 |
| Triethylene glycol monobutyl ether | | 3.0 | 3.0 | 3.0 | 3.0 | 3.0 | 3.0 | 3.0 |
| 1,2-Hexanediol | | 3.0 | 3.0 | 3.0 | 3.0 | 3.0 | 3.0 | 3.0 |
| Olfine E1010 | | 0.5 | 0.5 | 0.5 | 0.5 | 0.5 | 0.5 | 0.5 |
| S104PG50 | | 0.5 | 0.5 | 0.5 | 0.5 | 0.5 | 0.5 | 0.5 |
| Triethanolamine | | 1.0 | 1.0 | 1.0 | 1.0 | 1.0 | 1.0 | 1.0 |
| Water (pure water) | | Balance | Balance | Balance | Balance | Balance | Balance | Balance |
| Evaluation items | | | | | | | | |
| Foaming and defoaming properties | | A | A | A | A | A | A | A |
| Printed material robustness (abrasion resistance) | | B | B | A | A | B | A | B |
| Optical density (OD value) | | B | B | B | B | B | B | A |
| Ejection reliability | | A | A | B | A | A | A | B |
| Ink storage container usability | Ink storage container T1 (height L1: 3 cm) | A | A | A | A | A | A | A |
| | Ink storage container T2 (height L1: 5 cm) | A | A | A | A | A | A | A |
| | Ink storage container T3 (height L1: 2 cm) | A | A | A | A | A | A | A |

TABLE 2

|  | Comparative Example 1 | Comparative Example 2 | Comparative Example 3 | Comparative Example 4 | Comparative Example 5 |
|---|---|---|---|---|---|
| Ink composition |  |  |  |  |  |
| Self-dispersing pigment solid content mass %; (A) |  | 6.0 | 6.0 |  |  |
| Soap-free resin solid content mass %; (B) |  |  | 1.0 |  | 3.0 |
| Resin-coated pigment solid content of pigment mass %; (C) | 6.0 |  |  | 6.0 | 6.0 |
| Non soap-free resin solid content mass %; (D) |  | 3.0 |  | 3.0 |  |
| Resin-coated pigment solid content of added resin mass %; (E) | 2.0 |  |  | 2.0 | 2.0 |
| Total solid content (F) = (A) + (B) + (C) + (D) + (E) | 8.0 | 9.0 | 7.0 | 11.0 | 11.0 |
| k = A/B | — | — | 6.0 | — | — |
| Glycerin | 5.0 | 5.0 | 5.0 | 5.0 | 5.0 |
| Trimethylolpropane | 3.0 | 3.0 | 3.0 | 3.0 | 3.0 |
| Triethylene glycol | 2.0 | 2.0 | 2.0 | 2.0 | 2.0 |
| Trimethylglycine (amino coat) | 5.0 | 5.0 | 5.0 | 5.0 | 5.0 |
| Triethylene glycol monobutyl ether | 3.0 | 3.0 | 3.0 | 3.0 | 3.0 |
| 1,2-Hexanediol | 3.0 | 3.0 | 3.0 | 3.0 | 3.0 |
| Olfine E1010 | 0.5 | 0.5 | 0.5 | 0.5 | 0.5 |
| S104PG50 | 0.5 | 0.5 | 0.5 | 0.5 | 0.5 |
| Triethanolamine | 1.0 | 1.0 | 1.0 | 1.0 | 1.0 |
| Water (pure water) | Balance | Balance | Balance | Balance | Balance |
| Evaluation items |  |  |  |  |  |
| Foaming and defoaming properties | B | B | A | B | B |
| Printed material robustness (abrasion resistance) | B | B | C | A | A |
| Optical density (OD value) | B | B | B | B | B |
| Ejection reliability | A | A | A | B | B |
| Ink storage container usability — Ink storage container T1 (height L1: 3 cm) | B | B | A | B | B |
| Ink storage container usability — Ink storage container T2 (height L1: 5 cm) | B | B | A | B | B |
| Ink storage container usability — Ink storage container T3 (height L1: 2 cm) | A | A | A | A | A |

|  | Comparative Example 6 | Comparative Example 7 | Comparative Example 8 | Comparative Example 9 |
|---|---|---|---|---|
| Ink composition |  |  |  |  |
| Self-dispersing pigment solid content mass %; (A) | 6.0 | 6.0 | 3.0 | 10.0 |
| Soap-free resin solid content mass %; (B) | 1.5 | 6.0 | 3.0 | 2.0 |
| Resin-coated pigment solid content of pigment mass %; (C) |  |  |  |  |
| Non soap-free resin solid content mass %; (D) |  |  |  |  |
| Resin-coated pigment solid content of added resin mass %; (E) |  |  |  |  |
| Total solid content (F) = (A) + (B) + (C) + (D) + (E) | 7.5 | 12.0 | 6.0 | 12.0 |
| k = A/B | 4.0 | 1.0 | 1.0 | 5.0 |
| Glycerin | 5.0 | 5.0 | 5.0 | 5.0 |
| Trimethylolpropane | 3.0 | 3.0 | 3.0 | 3.0 |
| Triethylene glycol | 2.0 | 2.0 | 2.0 | 2.0 |
| Trimethylglycine (amino coat) | 5.0 | 5.0 | 5.0 | 5.0 |
| Triethylene glycol monobutyl ether | 3.0 | 3.0 | 3.0 | 3.0 |
| 1,2-Hexanediol | 3.0 | 3.0 | 3.0 | 3.0 |
| Olfine E1010 | 0.5 | 0.5 | 0.5 | 0.5 |
| S104PG50 | 0.5 | 0.5 | 0.5 | 0.5 |
| Triethanolamine | 1.0 | 1.0 | 1.0 | 1.0 |
| Water (pure water) | Balance | Balance | Balance | Balance |
| Evaluation items |  |  |  |  |
| Foaming and defoaming properties | A | A | A | A |
| Printed material robustness (abrasion resistance) | C | A | A | C |
| Optical density (OD value) | B | B | C | A |
| Ejection reliability | A | C | A | B |
| Ink storage container usability — Ink storage container T1 (height L1: 3 cm) | A | A | A | A |
| Ink storage container usability — Ink storage container T2 (height L1: 5 cm) | A | A | A | A |
| Ink storage container usability — Ink storage container T3 (height L1: 2 cm) | A | A | A | A |

The pigment dispersions and resin emulsions shown in Tables 1 and 2 were prepared as described below.

2.1.1. Preparation of Self-Dispersing Pigment Dispersion

A commercially available C.I. Pigment Red 122 (PG104 manufactured by Holbein) in an amount of 20 g was mixed into 500 g of water, and the resulting mixture was dispersed with a mixer for household use. The resulting liquid was introduced into a 3-L (liter) glass vessel equipped with a stirring device, and while stirring with a stirrer, a gas containing 8% by mass of ozone was introduced to the vessel at a flow rate of 500 mL/min. In this operation, ozone was generated using an electrolysis type ozonizer manufactured by Permelec Electrode Ltd. The resulting undiluted dispersion was filtered through a glass fiber filter GA-100 (trade name, manufactured by Advantec Toyo Kaisha, Ltd.), and the filtrate was concentrated to a solid content of 20% by mass while adjusting the pH to 9 by adding 0.1 N potassium hydroxide solution. Thus, a self-dispersing pigment dispersion was obtained.

2.1.2. Preparation of Resin Coated Pigment Dispersion

Into a reaction vessel sufficiently purged with nitrogen gas, 20 parts by mass of an organic solvent (methyl ethyl ketone), 0.03 parts by mass of a polymerization chain transfer agent (2-mercaptoethanol), 15 parts by mass of polypropylene glycol monomethacrylate (propylene oxide=9), 15 parts by mass of poly(ethylene glycol-propylene glycol)monomethacrylate (propylene oxide=7, ethylene oxide=5), 12 parts by mass of methacrylic acid, 50 parts by mass of styrene monomer, 10 parts by mass of styrene macromer, and 10 parts by mass of benzyl methacrylate were introduced, and under stirring at 75° C., 0.9 parts by mass of 2,2'-azobis(2,4-dimethylvaleronitrile), serving as a polymerization initiator, dissolved in 40 parts by mass of methyl ethyl ketone relative to 100 parts by mass of the monomer components was added to perform polymerization. Then, by performing aging at 80° C. for one hour, a polymer solution was obtained.

In 45 parts by mass of methyl ethyl ketone, 7.5 parts by mass of the water-insoluble polymer obtained as described above was dissolved. A predetermined amount of an aqueous solution containing 20% sodium hydroxide (neutralizing agent) was added thereto to neutralize a salt-forming group, and 20 parts by mass of the C.I. Pigment Red 122, as a pigment, was further added thereto, followed by kneading for two hours with a bead mill. After 120 parts by mass of ion-exchanged water was added to the kneaded product thus obtained, followed by stirring, methyl ethyl ketone was removed at 6° C. under reduced pressure, and further, water was partially removed. In this way, a resin coated pigment dispersion having a solid content of 20% by mass was obtained.

2.1.3. Preparation of Soap-Free Resin Emulsion

Into a reaction vessel equipped with a dropping device, a thermometer, a water-cooled reflux condenser, and a stirrer, 100 parts by mass of ion-exchanged water was introduced, and while stirring, in a nitrogen atmosphere, at 70° C., 0.2 parts by mass of ammonium persulfate serving as a polymerization initiator was added thereto. A monomer solution including 40 parts by mass of styrene, 34.6 parts by mass of methyl methacrylate, 10 parts by mass of lauryl methacrylate, and 15.4 parts by mass of acrylic acid was added dropwise into the reaction vessel to cause a reaction. Thus, a shell polymer was produced by polymerization. Then, a mixed solution including 0.2 parts by mass of potassium persulfate, 73 parts by mass of styrene, and 27 parts by mass of n-butyl acrylate was added dropwise thereto, and while stirring at 70° C., a polymerization reaction was carried out. The reaction product was neutralized with sodium hydroxide to adjust the pH to 8 to 8.5, and filtration was performed with a 0.3 μm filter. Thus, a soap-free resin emulsion was produced.

2.1.4. Preparation of Non Soap-Free Resin Emulsion

Into a reaction vessel equipped with a stirrer, a reflux condenser, a dropping device, and a thermometer, 900 g of ion-exchanged water and 1 g of sodium lauryl sulfate were fed, and under stirring, while nitrogen purging, the temperature was increased to 70° C. With the inside temperature being maintained at 70° C., 4 g of potassium persulfate was added as a polymerization initiator and dissolved therein, and then, an emulsion prepared in advance by adding, under stirring, 20 g of acrylamide, 365 g of styrene, 545 g of butyl acrylate, and 30 g of methacrylic acid to 450 g of ion-exchanged water and 3 g of sodium lauryl sulfate was continuously added dropwise into the reaction solution over four hours. After completion of dropwise addition, aging was performed for three hours. After the resulting resin emulsion was cooled to normal temperature, by adding ion-exchanged water and an aqueous solution of sodium hydroxide, the solid content was adjusted to 40% by mass, and the pH was adjusted to 8. The resin particles in the resulting aqueous emulsion had a glass transition temperature of −6° C.

Among the components shown in Table 2, the components shown by trade names are as follows. Betaine BP 20 (registered trade name) is trimethylglycine manufactured by DuPont. Olfine E1010 (trade name) is an acetylene glycol surfactant manufactured by Nissin Chemical Industry Co., Ltd. Surfynol 104PG50 (trade name) is an acetylene glycol surfactant manufactured by Nissin Chemical Industry Co., Ltd.

2.2 Definition of Evaluation Items 2.2.1. Foaming and Defoaming Properties

Figure 7:
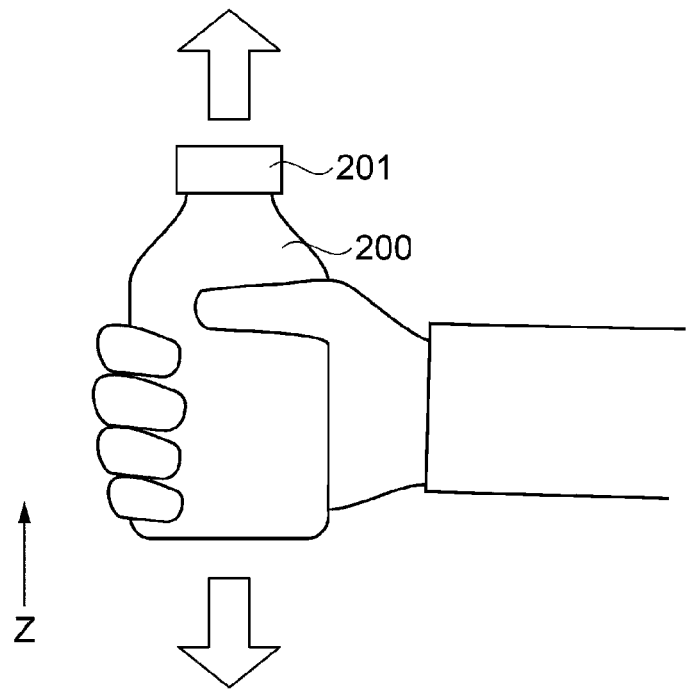
FIG. 7 is a view illustrating a method for evaluating foaming and defoaming properties.
Figure 8:
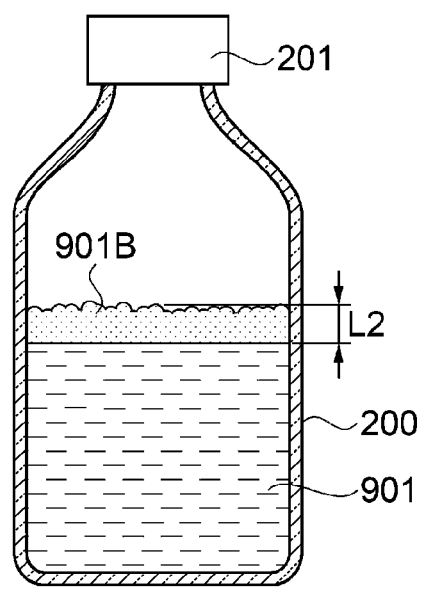
FIG. 8 is a view illustrating a method of measuring a foam height from the liquid level of an ink composition in the evaluation of foaming and defoaming properties.

FIG. 7 is a view illustrating a method for evaluating foaming and defoaming properties. FIG. 8 is a view illustrating a method of measuring a foam height from the liquid level of an ink composition in the evaluation of foaming and defoaming properties. As shown in FIG. 7, 15 g of each of the ink compositions shown in examples and comparative examples is placed in a sample bottle 200 made of glass, having a capacity of 50 mL and a cylindrical shape, and the sample bottle 200 is covered with a lid 201. The operator holds the sample bottle 200 with one hand and shakes the sample bottle 200, while counting the number of shakes, 100 times for one minute, in the upward-downward direction indicated by arrows in FIG. 7. One up-down shaking is counted as one time. Furthermore, the shaking width is about 20 cm. The shaking direction is not limited to the upward-downward direction indicated by arrows. It is preferable to perform shaking in a predetermined direction. Subsequently, as shown in FIG. 8, the sample bottle 200 is left to stand still, foam 901B at one minute after shaking is checked, and a height L2 from a liquid level in the center to the upper end of the foam 901B is measured with a ruler while visually checking the height L2. Evaluation was made based on the following criteria A and B. Evaluation criterion A: the height L2 of the foam 901B is 10 mm or less. Evaluation criterion B: the foam height L2 is more than 10 mm. The evaluation of foaming and defoaming properties is preferably A. Furthermore, instead of being shaken by the operator, the sample bottle 200 may be shaken with a dedicated shaking device. The evaluation results are also shown in Tables 1 and 2.

2.2.2. Printed Material Robustness (Abrasion Resistance)

Figure 9:
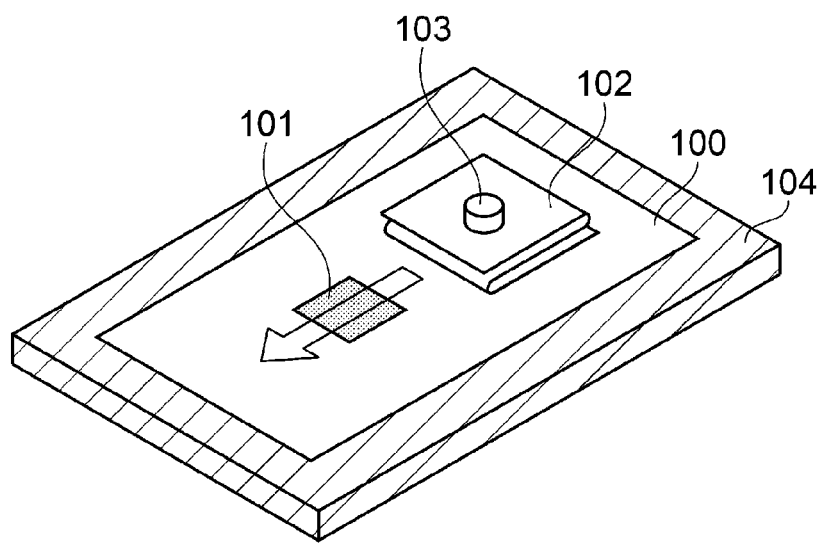
FIG. 9 is a view illustrating a method for evaluating printed material robustness (abrasion resistance).

FIG. 9 is a view illustrating a method for evaluating printed material robustness (abrasion resistance). As shown in FIG. 9, the operator feeds each of the inks shown in examples and comparative examples into an ink jet printer PX-S840 (manufactured by Seiko Epson Corporation) and prints a 2×2 cm square, monochromatic 100% Duty pattern 101 in the center of A4 size photo paper 100 (EPSON photo paper <gloss> KA4100PSKR). Drying is performed in a normal temperature environment for the evaluation time described below. After drying, the operator places the printed photo paper 100 on a metal plate 104, places a non-woven fabric wiper 102 (Bencot M-1 manufactured by Ozu Corporation), which is folded in four, on an unprinted portion of the photo paper 100, and mounts a cylindrical magnet 103 with a diameter of about 5 mm thereon such that a pressure of 50 gf is applied. The operator pulls the non-woven fabric wiper 102 with the magnet 103 being mounted on the non-woven fabric wiper 102 so that the magnet 103 is moved straight on the printed pattern 101, at a speed of about 0.5 sec/2 cm, to an unprinted portion of the photo paper 100. The operator visually checks the state of the printed pattern 101 after the magnet 103 is moved straight. Evaluation was made based on the following criteria A, B, and C. Evaluation criterion A: performed 12 hours after printing, and the photo paper 100 serving as a base is not visible. Evaluation criterion B: performed one day after printing, and the photo paper 100 serving as a base is not visible. Evaluation criterion C: performed one day after printing, and the photo paper 100 serving as a base is visible. The evaluation results are also shown in Tables 1 and 2. The robustness is preferably evaluated as B or higher, and more preferably evaluated as A.

2.2.3. Optical Density

Each of the inks shown in examples and comparative examples was fed into an ink jet printer PX-S840 (manufactured by Seiko Epson Corporation), and a monochromatic 100% Duty pattern 101 was printed on plain paper P (monochrome copy/printer paper) (Fuji Xerox). The OD value of the print was measured with a colorimeter i1 Basic Pro2. The measurement results were evaluated based on the following criteria A, B, and C. Evaluation criterion A: the OD value is more than 1.1. Evaluation criterion B: the OD value is 0.9 or more and 1.1 or less. Evaluation criterion C: the OD value is less than 0.9. The optical density is preferably evaluated as B or higher, and more preferably evaluated as A. The evaluation results are shown in Tables 1 and 2. Note that the OD value is represented by the logarithm of the absorbance (the reciprocal of the transmittance %).

2.2.4. Ejection Reliability

Each of the inks shown in examples and comparative examples was fed into an ink jet printer PX-S840 (manufactured by Seiko Epson Corporation), and with the power being off and the liquid ejecting head being removed from the head cap, the printer was allowed to stand in a constant temperature oven at 40° C. and at a relative humidity of 20% for seven days. Then, the printer was allowed to stand in a normal temperature environment for one hour, cleaning was performed from the printer operation panel, and a nozzle check pattern was printed. In the case where all the nozzles were not recovered, cleaning and printing of a nozzle check pattern were repeated. The number of times of cleaning until all the nozzles were recovered was evaluated based on criteria A, B, and C. Evaluation criterion A: the number of times of cleaning is 4 or less. Evaluation criterion B: the number of times of cleaning is 5 or 6. Evaluation criterion C: the number of times of cleaning is 7 or more. The ejection reliability is preferably evaluated as B or higher, and more preferably evaluated as A. The evaluation results are also shown in Tables 1 and 2.

2.2.5. Ink Storage Container Usability

Figure 10:
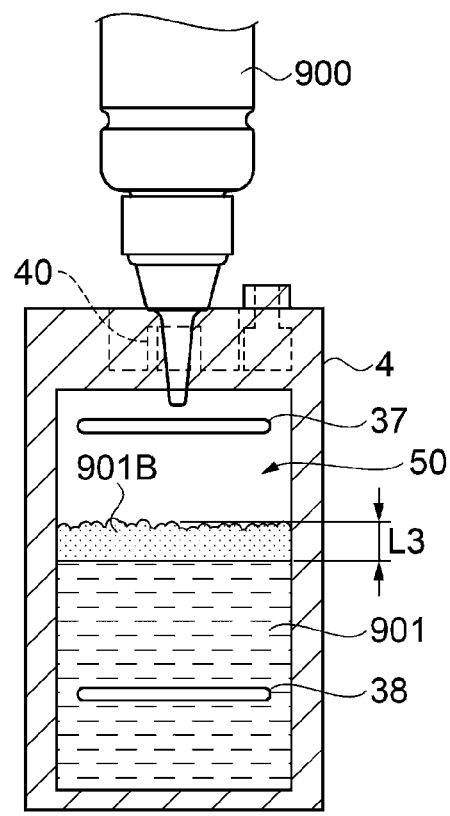
FIG. 10 is a view illustrating a method of measuring a foam height from the liquid level of an ink composition in an ink tank.

FIG. 10 is a view illustrating a method of measuring a foam height from the liquid level of an ink composition in an ink storage container. An ink 901, as each of the ink compositions shown in examples and comparative examples, was fed in an amount of 40 g into the above-described ink supply container 900. As shown in FIG. 10, using the ink supply container 900, the ink 901, as each of the ink compositions of examples and comparative examples, was poured into an ink tank 4 serving as an ink storage container provided with an ink pouring port 40. The ink tank 4 has a height L1 from an inner wall 36a of a bottom wall 36 facing the ink pouring port 40 of the ink tank 4 to the lower end of the ink pouring port 40 (refer to FIG. 4). Evaluation was made on standards with different heights L1. By using ink storage containers of three standards: an ink storage container T1 with L1 of 3 cm, an ink storage container T2 with L1 of 5 cm, and an ink storage container T3 with L1 of 2 cm, evaluation was conducted. At 60 seconds (one minute) after each of the inks 901 of examples and comparative examples was poured, a height L3 from a liquid level of the ink in the center to the upper end of a foam 901B was measured with a ruler while visually checking through a liquid visual recognition portion 50. Evaluation was made based on criteria A and B. Criterion A: L3 is 2 mm or less. Criterion B: L3 is more than 2 mm. The ink storage container usability is preferably evaluated as A. The evaluation results are also shown in Tables 1 and 2.

As shown in Tables 1 and 2, in all of Examples 1 to 7 in which the self-dispersing pigment and the soap-free resin were used, the foaming and defoaming properties, printed material robustness (abrasion resistance), optical density, ejection reliability, and ink storage container usability were all evaluated to be good.

In Examples 1 to 7 in which the self-dispersing pigment was used as a coloring material, and the soap-free resin was used as a resin, in comparison with Comparative Examples 1, 4, and 5 in which the resin coated pigment was used as a coloring material, and Comparative Examples 2 and 4 in which the non soap-free resin was used as a resin, the evaluation of foaming and defoaming properties was high. The reason for this is that the resin coated pigment and the non soap-free resin each contains an anionic surfactant which causes foaming.

Furthermore, in Example 7 in which the solid content (A) of the self-dispersing pigment was increased to 8.0% by mass, in comparison with Comparative Example 8 in which the solid content (A) of the self-dispersing pigment was decreased to 3.0% by mass, the evaluation of the optical density was high. The reason for this is that the amount of the self-dispersing pigment serving as a coloring material was increased. Furthermore, in Comparative Example 9 in which the solid content (A) of the self-dispersing pigment was increased to 10.0% by mass, in comparison with Example 1 in which the solid content (A) of the self-dispersing pigment was 6.0% by mass, the evaluation of ejection stability was low because of an increase in the total solid content in the ink.

Furthermore, in Examples 3 and 6 in which the solid content (B) of the soap-free resin was increased to 5.0% by mass, the evaluation of printed material robustness (abrasion resistance) was high. The reason for this is that since the solid content (B) of the soap-free resin was increased, the fixing property between the self-dispersing pigment and the photo paper 100 as a recorded material was improved. On the other hand, in Comparative Example 3 in which the solid content (B) of the soap-free resin was decreased to 1.0% by mass, the evaluation of printed material robustness (abrasion resistance) was low. Furthermore, in Comparative Example 7 in which the solid content (B) of the soap-free resin was increased to 6.0% by mass, although the evaluation of printed material robustness (abrasion resistance) was high, the evaluation of ejection reliability was low. The reason for this is that the total solid content in the ink was increased.

Furthermore, in Examples 1, 2, 4, 5, and 6 in which the total value (F) of the solid content (A) as the content of the self-dispersing pigment and the solid content (B) as the content of the soap-free resin in the ink composition was 9.0 or less, in comparison with Comparative Examples 7 and 9 in which the total value (F) of the solid content (A) of the self-dispersing pigment and the solid content (B) of the soap-free resin was 12.0% by mass, the evaluation of ejection reliability was high. The reason for this is that the total solid content (F) in the ink composition of Examples 1, 2, 4, 5, and 6 was lower than that of Comparative Examples 7 and 9.

Furthermore, in Examples 1 to 7 in which the ratio in percent by mass of the solid content (A) of the self-dispersing pigment to the solid content (B) of the soap-free resin, k=A/B, was 3.0 or less, in comparison with Comparative Examples 6 and 9 in which the ratio in percent by mass of the solid content (A) of the self-dispersing pigment to the solid content (B) of the soap-free resin, k=A/B, was more than 3.0, the evaluation of printed material robustness (abrasion resistance) was high. The reason for this is that since the solid content of the soap-free resin was low relative to the self-dispersing pigment, the fixing property between the self-dispersing pigment and the recorded material was decreased.

As is evident from the results described above, even when the height from the inner wall 36a of the bottom wall 36 of the ink tank 4 facing the ink pouring port 40 to the ink pouring port 40 is 3 cm or more, foaming of the ink composition can be suppressed, and the waiting time for waiting until foam naturally disappears can be reduced. Furthermore, since the ink composition does not foam, it is possible to decrease the possibility of spilling of foam from the ink pouring port 40 during pouring of the ink composition. In other words, a predetermined amount of the ink composition can be smoothly poured into the ink tank 4 such that foam does not spill from the ink pouring port 40.

Hereinafter, the contents derived from the embodiments will be described.

An ink composition according to an embodiment of the present disclosure is an ink composition to be used in an ink jet recording apparatus, the ink composition including a self-dispersing pigment, a soap-free resin, and water, in which, when 15 g of the ink composition is weighed into a 50-mL sample bottle and the sample bottle is shaken 100 times for one minute, at 60 seconds after shaking, a foam height from a liquid level is 1 cm or less.

According to the embodiment of the present disclosure, since a self-dispersing pigment and a soap-free resin are used, in comparison with the case where a resin dispersion type pigment is used, it is possible to provide an ink composition in which foaming can be reduced when the ink composition is poured into an ink storage container of an ink jet recording apparatus.

In the ink composition, the ink jet recording apparatus may include an ink storage container having an ink pouring port, and a height from an inner wall of the ink storage container facing the ink pouring port to the ink pouring port may be 3 cm or more.

According to this embodiment, even when the height from the inner wall of the ink storage container facing the ink pouring port to the ink pouring port is 3 cm or more, it is possible to decrease the height of the foam generated when the ink composition poured from the ink pouring port comes into contact with the inner wall of the ink storage container.

In the ink composition, a content A of the self-dispersing pigment may be 4.0% by mass or more and 8.0% by mass or less, a content B of the soap-free resin may be 1.5% by mass or more and 5.0% by mass or less, a total value F of the content A of the self-dispersing pigment and the content B of the soap-free resin may be 5.5% by mass or more and 11.0% by mass or less, and the ratio in percent by mass of the content A of the self-dispersing pigment to the content B of the soap-free resin, k=A/B, may be 3.0 or less.

According to this embodiment, by setting the content A of the self-dispersing pigment in the range described above, desired color development can be obtained in a printed material. Furthermore, by setting the ratio in percent by mass of the content A of the self-dispersing pigment to the content B of the soap-free resin, k=A/B, in the range described above, printed material robustness (abrasion resistance) in a printed material can be ensured. Furthermore, by setting the total value F of the content A of the self-dispersing pigment and the content B of the soap-free resin in the range described above, the ink composition can be stably ejected from nozzles of an ink jet head without causing clogging or the like.

An ink jet recording set according to an embodiment of the present disclosure includes an ink jet recording apparatus and an ink supply container containing an ink composition, in which the ink jet recording apparatus includes an ink storage container having an ink pouring port; a height from an inner wall of the ink storage container facing the ink pouring port to the ink pouring port is 3 cm or more; the ink composition includes a self-dispersing pigment, a soap-free resin, and water; and when 15 g of the ink composition is weighed into a 50-mL sample bottle and the sample bottle is shaken 100 times for one minute, at 60 seconds after shaking, a foam height from a liquid level is 1 cm or less.

According to the embodiment of the present disclosure, when the ink supply container is set at the ink pouring port and the ink composition is poured into the ink storage container, it is possible to decrease the height of the foam generated by contact of the ink composition with the inner wall of the ink storage container. Accordingly, since the time required until foam disappears is shorter than that in the related art, it is possible to provide an ink jet recording set which can start printing promptly after the ink composition is poured into the ink storage container.

In the ink jet recording set, in the ink composition, a content A of the self-dispersing pigment may be 4.0% by mass or more and 8.0% by mass or less, a content B of the soap-free resin may be 1.5% by mass or more and 5.0% by mass or less, a total value F of the content A of the self-dispersing pigment and the content B of the soap-free resin may be 5.5% by mass or more and 11.0% by mass or less, and the ratio in percent by mass of the content A of the self-dispersing pigment to the content B of the soap-free resin, k=A/B, may be 3.0 or less.

According to this embodiment, by setting the content A of the self-dispersing pigment in the range described above, desired color development can be obtained in a printed material. Furthermore, by setting the ratio in percent by mass of the content A of the self-dispersing pigment to the content B of the soap-free resin, k=A/B, in the range described above, printed material robustness (abrasion resistance) in a printed material can be ensured. Furthermore, by setting the total value F of the content A of the self-dispersing pigment and the content B of the soap-free resin in the range described above, it is possible to provide an ink jet recording set which can perform printing by stably ejecting the ink composition from nozzles of an ink jet head without causing clogging or the like.

The present disclosure is not limited to the embodiments described above and may be variously modified. For example, the present disclosure includes substantially the same structure as the structure described in the embodiments (e.g., a structure having the same function, method, and evaluation, or a structure having the same object and effect). Furthermore, the present disclosure includes a structure in which a non-essential part of the structure described in the embodiments is replaced. Furthermore, the present disclosure includes a structure in which the same operational advantage as that of the structure described in the embodiments can be obtained or a structure in which the same object can be achieved. Furthermore, the present disclosure includes a structure in which a known technique is added to the structure described in the embodiments.

What is claimed is:

1. An ink composition to be used in an ink jet recording apparatus, the ink composition comprising:
   a self-dispersing pigment;
   a soap-free resin; and
   water, wherein
   when 15 g of the ink composition is weighed into a 50-mL sample bottle and the sample bottle is shaken 100 times for one minute, at 60 seconds after shaking, a foam height from a liquid level is 1 cm or less.

2. The ink composition according to claim 1, wherein
   the ink jet recording apparatus includes an ink storage container having an ink pouring port, and
   a height from an inner wall of the ink storage container facing the ink pouring port to the ink pouring port is 3 cm or more.

3. The ink composition according to claim 1, wherein
   a content A of the self-dispersing pigment is 4.0% by mass or more and 8.0% by mass or less,
   a content B of the soap-free resin is 1.5% by mass or more and 5.0% by mass or less,
   a total value F of the content A of the self-dispersing pigment and the content B of the soap-free resin is 5.5% by mass or more and 11.0% by mass or less, and
   a ratio in percent by mass of the content A of the self-dispersing pigment to the content B of the soap-free resin, k=A/B, is 3.0 or less.

4. An ink jet recording set comprising:
   an ink jet recording apparatus; and
   an ink supply container containing an ink composition, wherein
   the ink jet recording apparatus includes an ink storage container having an ink pouring port;
   a height from an inner wall of the ink storage container facing the ink pouring port to the ink pouring port is 3 cm or more;
   the ink composition includes a self-dispersing pigment, a soap-free resin, and water; and
   when 15 g of the ink composition is weighed into a 50-mL sample bottle and the sample bottle is shaken 100 times for one minute, at 60 seconds after shaking, a foam height from a liquid level is 1 cm or less.

5. The ink jet recording set according to claim 4, wherein, in the ink composition,
   a content A of the self-dispersing pigment is 4.0% by mass or more and 8.0% by mass or less,
   a content B of the soap-free resin is 1.5% by mass or more and 5.0% by mass or less,
   a total value F of the content A of the self-dispersing pigment and the content B of the soap-free resin is 5.5% by mass or more and 11.0% by mass or less, and
   a ratio in percent by mass of the content A of the self-dispersing pigment to the content B of the soap-free resin, k=A/B, is 3.0 or less.

* * * * *